(12) United States Patent
Matsui et al.

(10) Patent No.: US 6,189,957 B1
(45) Date of Patent: Feb. 20, 2001

(54) ELECTRIC DEVICE PROTECTING STRUCTURE

(75) Inventors: Hideyuki Matsui; Kazunori Osawa; Eiichirou Tanabe, all of Saitama; Yoshihiro Nakajima, Yokohama; Masayuki Miyamoto, Kanagawa; Tsuneyuki Takahashi, Kanagawa; Shinya Sato, Kanagawa, all of (JP)

(73) Assignees: Calsonic Kansei Corporation, Tokyo; Nissan Motor Co., Ltd., Yokohama, both of (JP)

( * ) Notice: Under 35 U.S.C. 154(b), the term of this patent shall be extended for 0 days.

(21) Appl. No.: 09/416,962

(22) Filed: Oct. 13, 1999

(30) Foreign Application Priority Data

Oct. 15, 1998 (JP) .................................................. 10-293662

(51) Int. Cl.⁷ ............................. B60K 37/06; B62D 25/14
(52) U.S. Cl. .......................... 296/192; 296/70; 296/208; 296/37.1
(58) Field of Search ............................. 296/192, 70, 208, 296/37.1

(56) References Cited

U.S. PATENT DOCUMENTS

| | | | |
|---|---|---|---|
| 4,332,187 | * | 6/1982 | Imai et al. ............................ 296/208 |
| 4,630,160 | * | 12/1986 | Murayama ........................... 296/37.1 |
| 4,962,961 | * | 10/1990 | Ito et al. ............................... 296/192 |
| 5,082,078 | * | 1/1992 | Umeda et al. .......................... 296/70 |
| 5,120,106 | * | 6/1992 | Sakuri et al. ........................... 296/70 |
| 5,127,703 | * | 7/1992 | Takahashi ............................. 296/208 |
| 5,145,457 | * | 9/1992 | Tanigaito et al. ..................... 296/192 |
| 5,354,114 | * | 10/1994 | Kelman et al. ....................... 296/208 |
| 5,533,779 | * | 7/1996 | Epple et al. .......................... 296/192 |
| 5,632,673 | * | 5/1997 | DeRees ................................ 296/208 |
| 5,707,100 | * | 1/1998 | Suyama et al. ....................... 296/192 |
| 5,857,726 | * | 1/1999 | Yokoyama et al. .................... 296/70 |
| 5,941,336 | * | 8/1999 | Saito et al. ........................... 296/194 |

FOREIGN PATENT DOCUMENTS

| | | |
|---|---|---|
| 0 659 599 | 6/1995 | (EP) . |
| 2 706 727 | 12/1994 | (FR) . |
| 2 329 363 | 3/1999 | (GB) . |
| 8-99590 | 4/1996 | (JP) . |
| 9-207691 | 8/1997 | (JP) . |
| 97/42058 | 11/1997 | (WO) . |

* cited by examiner

Primary Examiner—D. Glenn Dayoan
Assistant Examiner—Greg Blankenship
(74) Attorney, Agent, or Firm—Foley & Lardner

(57) ABSTRACT

For protecting a sensitive electric device, a motor vehicle is constructed to have an electric device protecting structure near a dash panel to which a cowl box is connected. A watertight case installs therein the sensitive electric device and is installed in the cowl box. A passage structure is provided to establish an air flow communication between an interior of the watertight case and an interior of a passenger room.

17 Claims, 5 Drawing Sheets

ELECTRIC DEVICE PROTECTING STRUCTURE

BACKGROUND OF THE INVENTION

1. Field of the Invention

The present invention relates in general to an electric device protecting structure for use in a motor vehicle, and more particularly to a watertight casing structure for protecting an electric device. More specifically, the present invention is concerned with an electric device protecting structure by which a sensitive electric device installed therein is protected from being affected by abnormal temperature, abnormal humidity and dusts.

2. Description of the Prior Art

In a motor vehicle, various electric devices are mounted, some of which are arranged in an engine room. However, since the engine room has therein an engine serving as a heat generator and is exposed to the outside through its opened bottom, the environment in the engine room is not suitable for such electric devices. Thus, in case of very sensitive electric devices which are for example an engine control module (ECM) or the like, it is usual to provide in the engine room so-called electric device protecting structures which house therein the electric devices.

FIG. 4 shows one known example of such electric device protecting structures, which is disclosed in Japanese Patent First Provisional Publication 9-207691. In the protecting structure of this example, there is employed a measure for protecting the electric device from heat generated from the engine. That is, a double wall casing structure 4 is provided at a certain position of the engine room, which comprises an inner case 1 and an outer case 2 between which an air flow passage 3 is defined. The air flow passage 3 is connected through a pipe or the like to an outside air intake opening exposed to the outside of the vehicle. An engine control module 5 which is sensitive to heat is installed in the inner case 1. When the vehicle runs, outside air is forced to flow in the air flow passage 3 while cooling the engine control module 5 in the inner case 1.

FIG. 5 shows another known example of the electric device protecting structures, which is disclosed in Japanese Patent First Provisional Publication 8-99590. That is, in this example, a heat sensitive electric control device 7 is installed in a cowl box 6 that is provided at an upper part of the engine room. Due to its isolated structure, the interior of the cowl box 6 is less affected by heat in the engine room and thus the interior is a suitable place for protecting the electric control device 7 from heat of the engine room. However, since the interior of the cowl box 6 is substantially exposed to the outside through openings and thus easily collects rainwater and the like, the electric control device 7 is constructed to have a sealed structure.

However, due to their inherent constructions, the above-mentioned two known examples have failed to provide users with satisfaction because of the following reasons. In the first example of FIG. 4, due to provision of the double wall structure, the protecting structure is bulky in size and thus largely occupies the limited space of the engine room. In the second example of FIG. 5, the sealed structure tends to lose its sealing ability quickly. That is, when energized, the electric control device 7 generates heat and thus heats the air in the sealed structure, and when deenergized, the electric control device 7 stops generating heat and thus cools the air in the sealed structure. The ON/OFF operation of the electric control device 7 thus induces expansion and contraction of air in the sealed structure causing higher pressure and lower pressure in the sealed structure. This phenomenon however applies the sealed structure with repeated stress. Thus, when the sealed structure is left in such severe condition, the sealing ability of the sealed structure becomes poor quickly.

SUMMARY OF THE INVENTION

It is therefore an object of the present invention to provide an electric device protecting structure which is free of the above-mentioned drawbacks.

According to a first aspect of the present invention, there is provided an electric device protecting structure for use in a motor vehicle. The vehicle has an engine room and a passenger room which are separated by a dash panel and a cowl box which is supported by the dash panel while projecting into the passenger room. The electric device protecting structure comprises a watertight case substantially installed in the cowl box, the watertight case having a sensitive electric device hermetically installed therein; and a passage structure which establishes an air flow communication between an interior of the watertight case and an interior of the passenger room.

According to a second aspect of the present invention, there is provided an electric device protecting structure for use in a motor vehicle. The motor vehicle has an engine room and a passenger room which are separated by a dash panel and a cowl box which is supported by the dash panel while projecting into the passenger room. The electric device protecting structure comprises a watertight case held by the dash panel, the watertight case including a major part installed in the cowl box and a base part projected into the engine room, the major part having therein a sensitive electric device installed therein; an opening formed in the base part for passing therethrough a wire harness of the electric device to the engine room; a sleeve having one end connected to the opening and extending obliquely downward; and a passage structure which establishes an air flow communication between an interior of the watertight case and an interior of the passenger room.

DETAILED DESCRIPTION OF THE EMBODIMENTS

Figure 1:
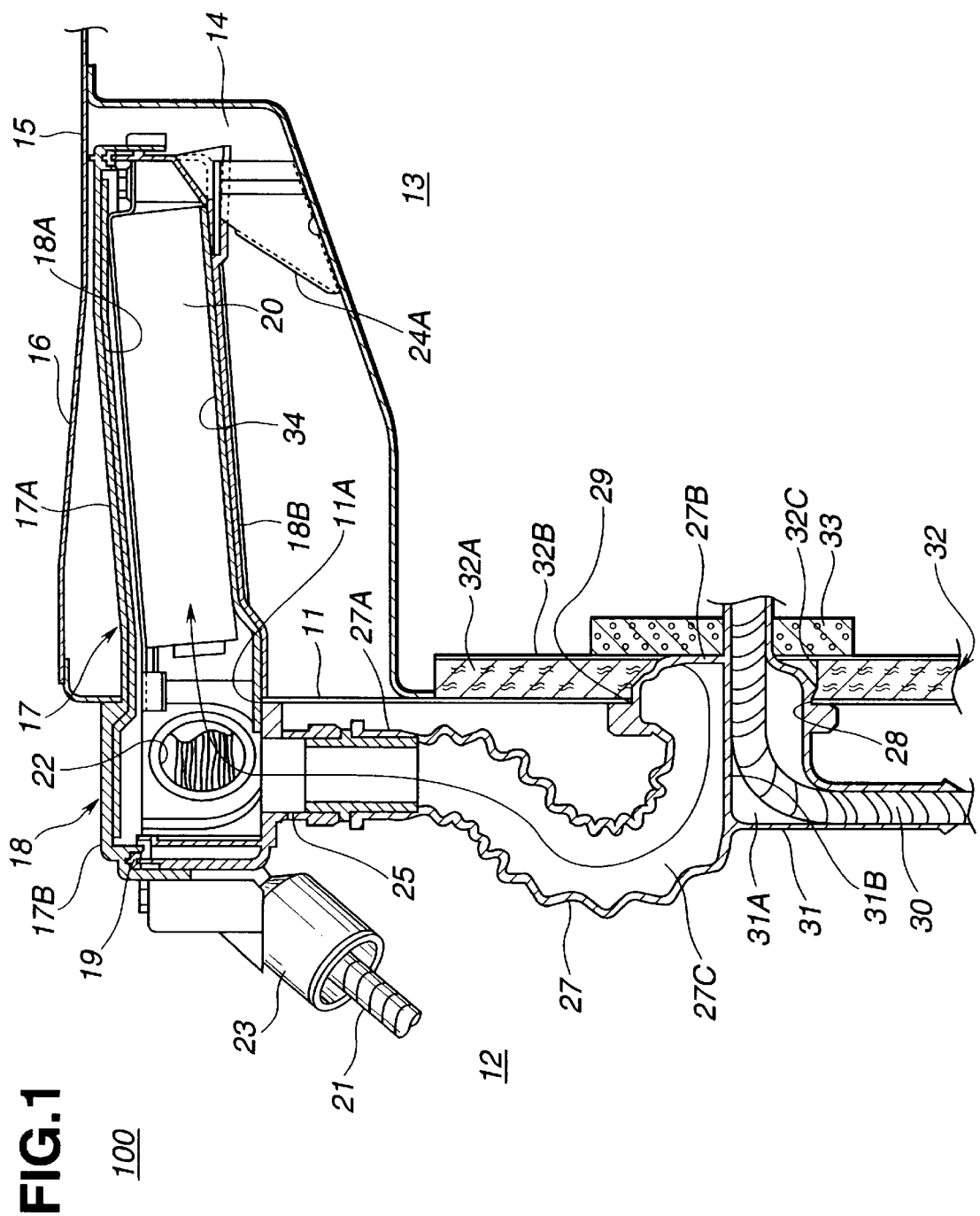
FIG. 1 is a sectional view of an electric device protecting structure which is a first embodiment of the present invention.
Figure 2:
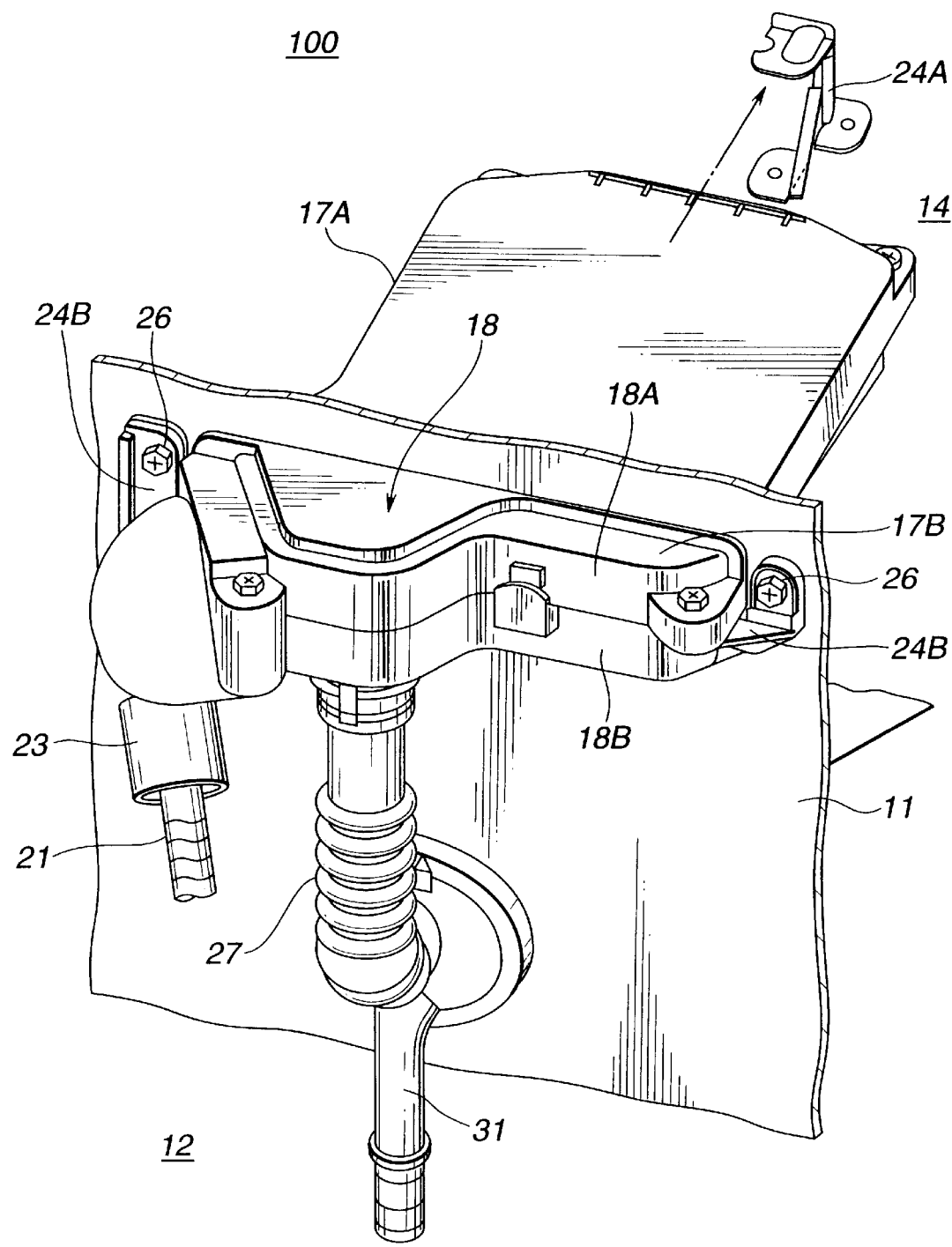
FIG. 2 is a perspective view of the electric device protecting structure of the first embodiment, which is viewed from the engine room.

Referring to FIGS. 1 and 2, there is shown an electric device protecting structure 100 which is a first embodiment of the present invention. The structure 100 is arranged in association with a dash panel and a cowl box of a motor vehicle.

In FIGS. 1 and 2, particularly FIG. 1, denoted by numeral 11 is a dash panel by which an engine room 12 and a passenger room 13 are separated from each other. The dash panel 11 is provided at its upper portion with a cowl box 14 which is projected into the passenger room 13 while extending transversely. Denoted by numeral 15 is a top panel which covers the cowl box 14. The cowl top panel 15 is formed with a plurality of slots 16 through which outside air is led into the cowl box 14. Although not shown in the drawing, the cowl box 14 is formed with an air outlet port through which the outside air is led to an outside air inlet port of an air conditioning device.

Projected into the cowl box 14 through an opening 11A formed in the dash panel 11 is an electric device unit 17 such as engine control module or the like, which is held by the dash panel 11 and the cowl box 14. The electric device unit 17 generally comprises an electric device 20 and a watertight case 18 which tightly houses therein the electric device 20. A lower wall of the watertight case 18 is equipped with a heat insulating sheet 34 for putting thereon the electric device 20. Preferably, the heat insulating sheet 34 is made of ethylene propylene dien monomer (EPDM) in view of its satisfied heat resistance, thermal conductivity and hygroscopicity.

The watertight case 18 comprises an upper shell 18A and a lower shell 18B which are coupled together with a watertight packing 19 hermetically interposed therebetween. A wire harness 21 of the electric device 20 extends to the engine room 12 through a harness pull-out opening 22 formed in the case 18 and a sleeve 23 connected to the harness pull-out opening 22. As shown, the sleeve 23 has a leading end directed obliquely downward, so that entering of water into the interior of the watertight case 18 through the sleeve 23 is avoided.

As is seen from FIGS. 1 and 2, the electric device unit 17 is held in the opening 11A having a major part 17A thereof placed in the cowl box 14 and a base part 17B thereof projected into the engine room 12. The major part 17A of the unit 17 is secured to the cowl box 14 through a bracket 24A and bolts and the base part 17B of the unit 17 is secured to the dash panel 11 through brackets 24B and bolts 26. As is seen from FIG. 1, the harness pull-out opening 22 is formed in the base part 17B of the electric device unit 17.

As is seen from FIG. 1, the base part 17B of the unit 17 has a wall thicker than that of the major part 17A. Due to provision of such thicker wall of the base part 17A, sound transmission from the engine room 12 to the interior of the unit 17 is minimized.

As is seen from FIGS. 1 and 2, the base part 17B of the unit 17 is formed at its lower wall with a hose connecting opening 25 to which an upper part 27A of a bellows type hose 27 is connected. A lower part 27B of the hose 27 is hermetically connected to an opening 28 formed in the dash panel 11. For this hermetical connection, an annular groove 29 formed around the lower part 27B snugly receives a peripheral edge of the opening 28, as shown.

The lower part 27B of the hose 27 is integrally formed with a sleeve portion 31 through which another wire harness 30 passes for being led into the passenger room 13. The interior 27C of the hose 27 and the interior 31A of the sleeve portion 31 are partitioned by a partition wall 31B. That is, the interior 27C of the hose 27 and the interior 31A of the sleeve portion 31 are isolated from each other.

As is seen from FIG. 1, a sound insulating layer 32 is bonded to the dash panel 11 from the passenger room 13. The insulating layer 32 is formed with an opening 32C in which the lower end 27B of the hose 27 is received. The insulating layer 32 comprises a first layer 32A of air permeable insulating material such as cotton or the like and a second layer 32B of insulation sheet such as rubber sheet or the like. The opening 32C of the insulating layer 32 is covered with a sound insulating pad 33 made of foamed polyurethane or the like.

It is thus to be noted that the interior of the electric device unit 17, more specifically, the interior of the watertight case 18 is fluidly communicated with the interior of the passenger room 13 through the hose 27 and the air permeable first layer 32A of the insulating layer 32.

In the following, advantages of the electric device protecting structure 100 of the first embodiment will be described.

First, as is described hereinabove, the major part 17A of the electric device unit 17 is installed in the cowl box 14. Accordingly, it often occurs that the major part 17A gets wet with rainwater or the like. However, the watertight case 18 of the unit 17 protects the electric device 20 from such water. That is, the sleeve 23 and the watertight packing 19 applied to the case 18 improve the waterproof of the case 18.

Second, the interior of the watertight case 18 is fluidly communicated with the passenger room 13 through the hose 27. Thus, even when electric device 20 is energized and deenergized, undesired repetition of higher and lower pressure does not occur in the watertight case 18. That is, if, due to heat generation from the device 20, the pressure in the case 18 is about to increase, the same is instantly led to the passenger room 13 through the hose 27, and if, due to OFF condition of the device 20, the pressure in the case 18 is about to decrease, the pressure of the passenger room 13 is instantly led into the case 18 through the hose 27. Accordingly, the sealing ability of the watertight case 18 is kept for a long time. That is, the durability of watertight case 18 is increased.

Third, the interior of the watertight case 18 is communicated with only the passenger room 13 of which air is relatively clean as compared with the outside air. Accordingly, the electric device 20 in the case 18 is protected from contamination. This assures reliable operation of the electric device 20.

Fourth, for mounting thereon the electric device 20, the lower wall of the watertight case 18 is equipped with the heat insulating sheet 34. Thus, the lower wall is protected from collecting dew drops thereby assuring reliable operation of the electric device 20.

Fifth, the hose 27 is of a bellows type and thus can be easily flexed and bent. Thus, freedom of positioning of the watertight case 18 and the opening 28 of the dash panel 11 increases. That is, the electric device protecting structure 100 is equally applicable to both a vehicle having a steering wheel at a left side and a vehicle having the steering wheel at a right side.

Sixth, the base part 17B of the electric device unit 17 has a thicker wall, and the sound insulating layer 32 and the sound insulating pad 33 are attached to the dash panel 11. Thus, the passenger room 13 is sufficiently insulated from noises generated in the engine room 12.

Figure 3:
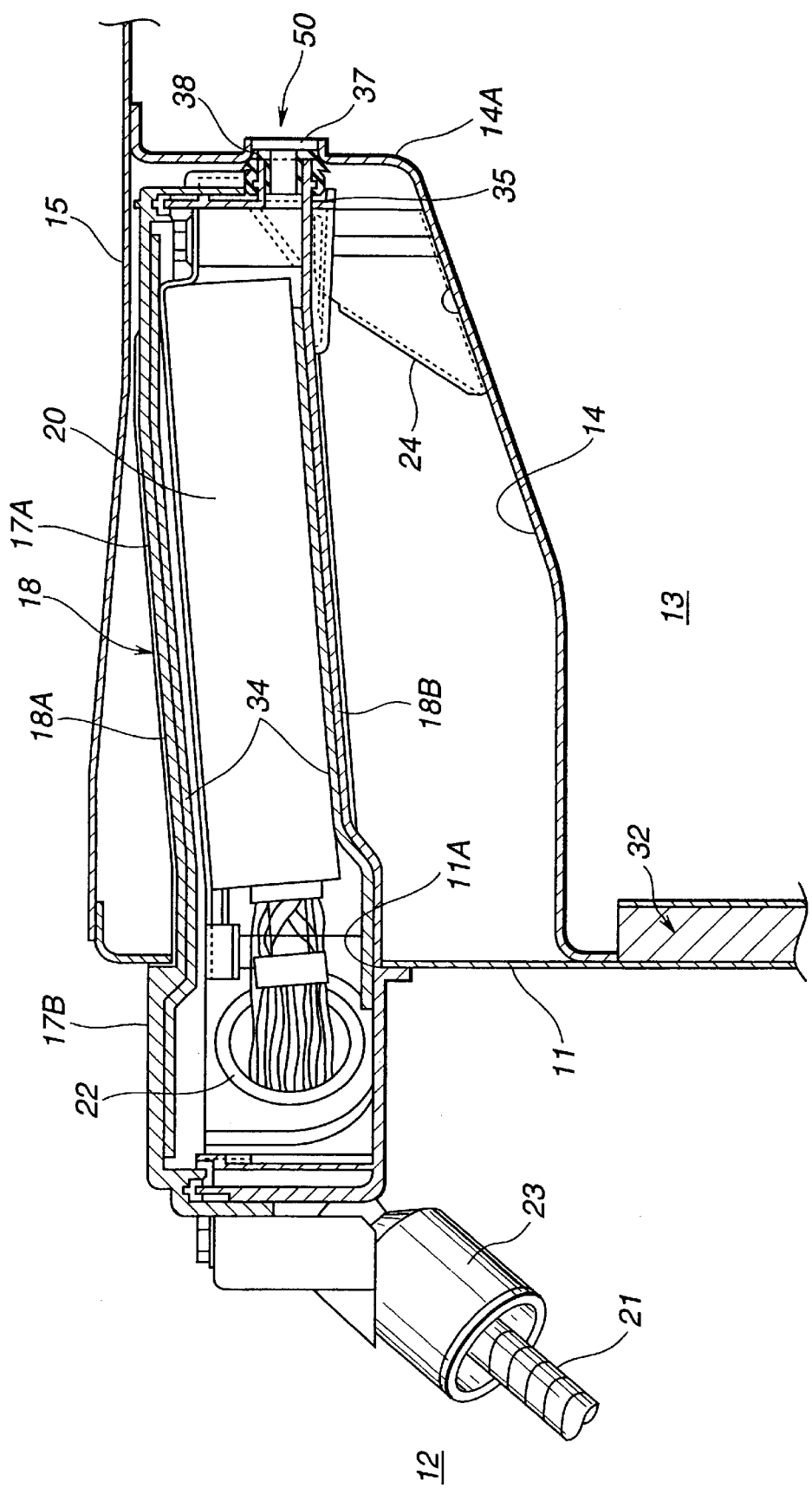
FIG. 3 is a sectional view of an electric device protecting structure which is a second embodiment of the present invention.
Figure 4:
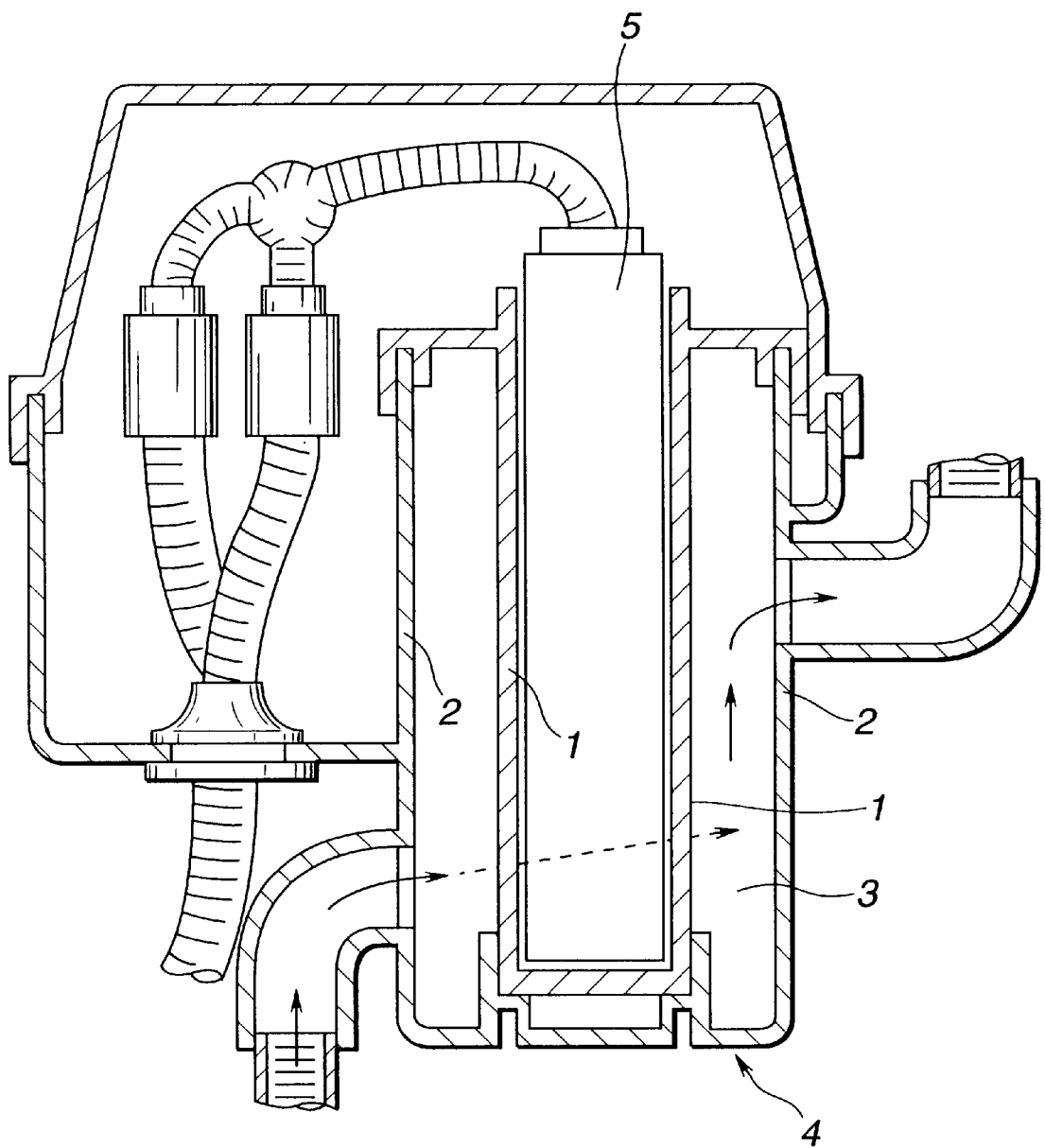
FIG. 4 is a sectional view of a known electric device protecting structure.
Figure 5:
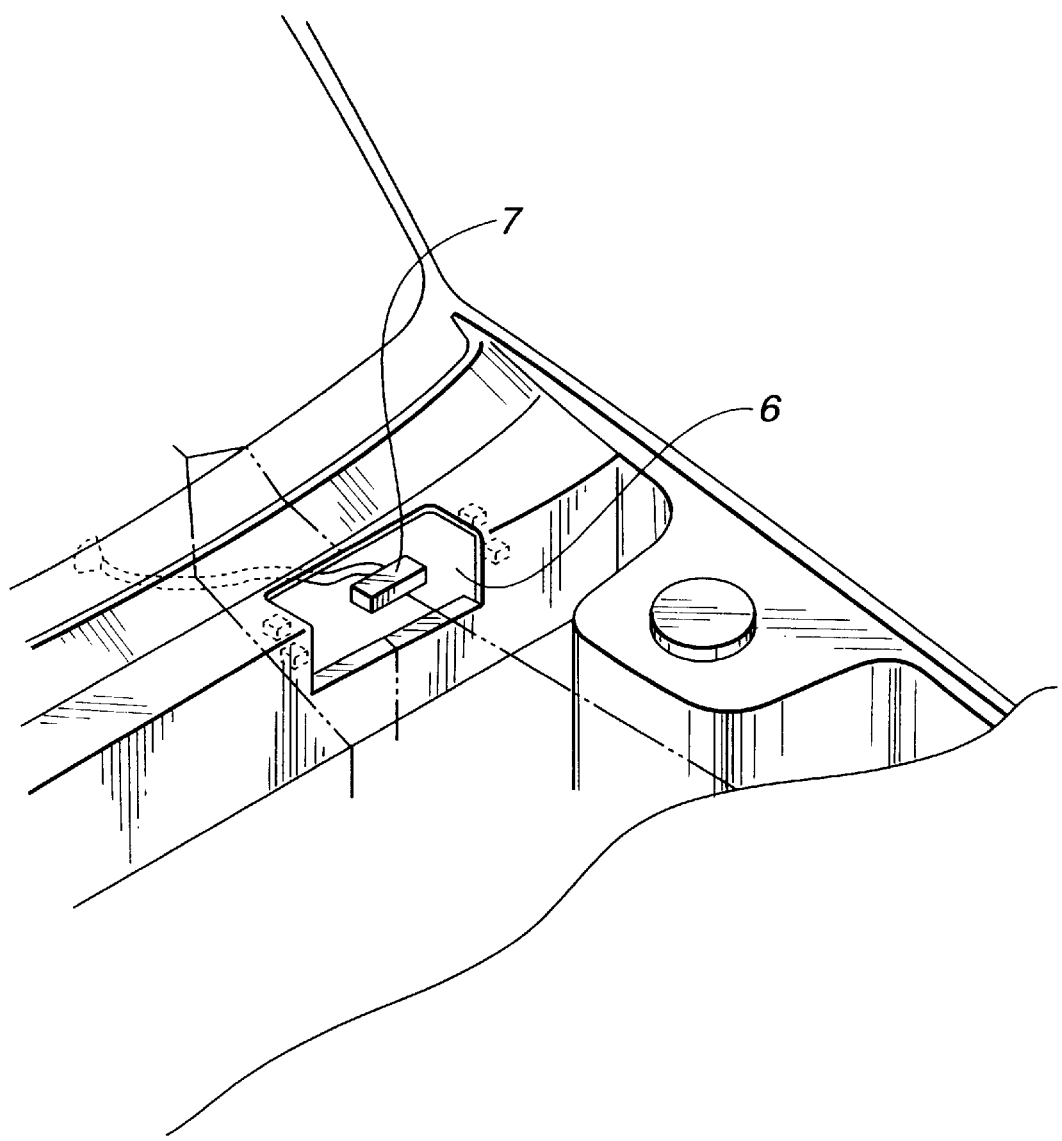
FIG. 5 is a partially broken view of a vehicle body, showing another known electric device protecting structure.

Referring to FIG. 3, there is shown an electric device protecting structure 200 which is a second embodiment of the present invention.

Since the structure 200 of the second embodiment is similar to the structure 100 of the above-mentioned first embodiment, only portions which are different from those of the first embodiment 100 will be described in detail in the following.

As shown in the drawing, in this second embodiment 200, in place of the hose (27) used in the first embodiment 100, a piping structure 50 is used for establishing the fluid communication between the interior of the watertight case 18 and the passenger room 13.

The piping structure 50 comprises a pipe 35 integrally formed on a back wall of the watertight case 18. A cylindrical rubber seal 38 is intimately put in the pipe 35 having an enlarged head thereof projected from the pipe 35. A bottom wall 14A of the cowl box 14 is formed, at a position facing the pipe 35, with an opening 37. In assembly, the pipe 35 abuts against a periphery of the opening 37 with the projected head of the seal 38 compressed therebetween.

In the second embodiment 200, both the upper and lower walls of the watertight case 18 are equipped with heat insulating sheets 34 respectively.

Because of the similar structure to the first embodiment 100, the electric device protecting structure 200 of the second embodiment can have the same advantages as those of the first embodiment 100 except the fifth advantage brought by the hose (27). In addition to such advantages, the structure 200 of the second embodiment can be made compact in size due to usage of the compact piping structure 50.

The entire contents of Japanese Patent Application P10-293662 (filed Oct. 15, 1998) are incorporated herein by reference.

Although the invention has been described above with reference to certain embodiments of the invention, the invention is not limited to the embodiments described above. Various modifications and variations of the embodiments described above will occur to those skilled in the art, in light of the above teachings.

What is claimed is:

1. In a motor vehicle having an engine room and a passenger room which are separated by a dash panel and a cowl box which is supported by said dash panel while projecting into the passenger room, an electric device protecting structure comprising:
    a watertight case substantially installed in said cowl box, said watertight case having an electric device hermetically installed therein; and
    a passage structure which establishes an air flow communication between an interior of said watertight case and an interior of said passenger room.

2. An electric device protecting structure as claimed in claim 1, in which said passage structure comprises:
    a hose extending in said engine room and having a first end connected to the interior of said watertight case and a second end connected to the interior of said passenger room.

3. An electric device protecting structure as claimed in claim 2, in which the first end of said hose is connected to a base part of said watertight case, said base part being exposed to said engine room.

4. An electric device protecting structure as claimed in claim 3, in which said base part is formed with an opening to which the first end of said hose is connected.

5. An electric device protecting structure as claimed in claim 2, in which the second end of said hose is connected to an opening formed in said dash panel thereby exposing said second end to the passenger room.

6. An electric device protecting structure as claimed in claim 5, further comprising an air permeable sound insulating pad which is put on said dash panel while covering the exposed second end of said hose.

7. An electric device protecting structure as claimed in claim 4, in which the base part of said watertight case is formed with another opening through which a wire harness of said electric device is led to the engine room.

8. An electric device protecting structure as claimed in claim 7, in which said another opening is equipped with a sleeve which extends obliquely downward.

9. An electric device protecting structure as claimed in claim 5, in which the second end of said hose is integrally formed with an isolated sleeve portion through which a wire harness extends between the engine room and the passenger room.

10. An electric device protecting structure as claimed in claim 1, in which said passage structure comprises:
    an opening formed in a wall of said cowl box;
    a pipe integrally formed on said watertight case, said pipe having a leading end connected to said opening; and
    a seal member interposed between the leading end of said pipe and the opening of the wall of said cowl box.

11. An electric device protecting structure as claimed in claim 10, in which said seal member is a cylindrical rubber seal which is intimately put in said pipe having an enlarged head portion thereof projected from the pipe, and in which said enlarged head portion is compressed between the leading end of said pipe and the opening of the wall of said cowl box.

12. An electric device protecting structure as claimed in claim 11, in which a base part of said watertight case is exposed to said engine room and formed with an opening through which a wire harness of said electric device is led to the engine room.

13. An electric device protecting structure as claimed in claim 12, in which the opening of said base part is equipped with a sleeve which extends obliquely downward.

14. In a motor vehicle having an engine room and a passenger room which are separated by a dash panel and a cowl box which is supported by said dash panel while projecting into the passenger room, an electric device protecting structure comprising:
    a watertight case held by said dash panel, said watertight case including a major part installed in said cowl box and a base part projected into said engine room, said major part having an electric device installed therein;
    an opening formed in said base part for passing therethrough a wire harness of said electric device to said engine room;
    a sleeve having one end connected to said opening and extending obliquely downward; and
    a passage structure which establishes an air flow communication between an interior of said watertight case and an interior of said passenger room.

15. An electric device protecting structure as claimed in claim 14, further comprising a heat insulating sheet through which the electric device is received in said watertight case.

16. An electric device protecting structure as claimed in claim 15, in which the base part of said watertight case has a wall thicker than that of said major part.

17. An electric device protecting structure as claimed in claim 15, in which the major part of said watertight case is connected to a bottom wall of said cowl box through a bracket and bolts.

* * * * *